United States Patent [19]

Hargest

[11] 3,842,830

[45] Oct. 22, 1974

[54] SURGICAL DRESSING AND METHOD OF FORMING THE SAME

[76] Inventor: Thomas S. Hargest, 1078 Winslow Dr., Charleston, S.C. 29412

[22] Filed: Mar. 26, 1973

[21] Appl. No.: 344,856

[52] U.S. Cl................................. 128/155, 128/325
[51] Int. Cl.............................................. A611 15/03
[58] Field of Search ............ 128/155, 156, 296, 325

[56] References Cited
UNITED STATES PATENTS

| | | | |
|---|---|---|---|
| 3,187,747 | 6/1965 | Burgeni et al. | 128/156 |
| 3,238,100 | 3/1966 | Meyer et al. | 128/156 UX |
| 3,723,244 | 3/1973 | Breillatt, Jr. | 128/156 X |

FOREIGN PATENTS OR APPLICATIONS

| | | | |
|---|---|---|---|
| 522,886 | 6/1940 | Great Britain | 128/325 |

*Primary Examiner*—Lucie H. Laudenslager
*Attorney, Agent, or Firm*—Dawson, Tilton, Fallon & Lungmus

[57] ABSTRACT

A surgical dressing formed in situ by applying a quantity of non-toxic sterile ceramic microparticles directly to the site of injury. The microparticles are generally spherical, fall within the size range of approximately 30 to 150 mesh, and have a specific gravity substantially in excess of 1.0.

4 Claims, No Drawings

SURGICAL DRESSING AND METHOD OF FORMING THE SAME

BACKGROUND

Considerable effort has been expended in past years to develop a superior dressing for abrasions, wounds, and burns. Ideally, such a dressing should arrest bleeding and fluid loss, protect against infection, provide thermal insulation, and, in general, promote healing without at the same time producing undesirable side effects. The inadequacies of conventional gauze bandages in each of these areas are well recognized. Some efforts have been directed to alternative methods of burn and wound protection, including the use of dry materials which might be dusted onto the site of injury. Powders capable of being absorbed by the body, such as those formed from dried eggshell membranes (U.S. Pat. No. 3,194,732) and cellulosic materials (U.S. Pat. No. 2,914,444 and 3,122,479), as well as non-absorbable or partially absorbable particles (U.S. Pat. No. 3,098,790 and 3,326,213), have been disclosed but, at most, have achieved only limited acceptance.

SUMMARY

An important aspect of this invention lies in the discovery that glass microparticles are surprisingly effective in forming a hemostatic and bacteriostatic matrix for a surgical dressing and, in particular, that such microparticles, applied directly to a traumatized area, arrest bleeding and promote healing without producing undesirable reactions or effects. In the past, although medical researchers have been aware of the hemostatic properties of glass, particles of glass have generally been regarded as hazardous to health, having potentialities for producing incisive trauma. While recent investigations raise doubts concerning the extent of such hazards, no suggestions have been made that the hemostatic properties of glass might be utilized in wound healing or that glass microparticles might have beneficial effects in treating abrasions, burns, and wounds.

A surgical dressing, formed in place by applying ceramic microparticles of specific size, composition, density and configuration directly to the wet tissue surfaces in the zone of injury, not only gives rise to the beneficial effects described but is non-irritating, does not induce a foreign body reaction, and does not produce granuloma. As used herein, the term "surgical dressing" is intended to mean a dressing applied to an external or internal traumatized area, whether the condition of the traumatized area results from a burn, cut, abrasion, ulceration, or from surgical intervention, and whether such dressing is later released, removed, absorbed, or indefinitely retained in place. Similarly, the word "injury" is used herein to mean traumatized area of the body which is wet with blood or other body fluid as a result of a burn, cut, abrasion, ulceration, or surgical intervention.

The invention is practiced by simply applying a quantity of ceramic microparticles directly to the site of injury. Where bleeding is to be arrested, the quantity of microparticles should exceed the volume of blood available at that site. The microparticles should be sterile and inert (non-toxic) and should be of a size within the range of 30 to 150 mesh, the preferred range being 70 to 100 mesh. Also, the microparticles should be generally spherical or rounded in configuration and must have a specific gravity substantially in excess of 1.0.

Other objects and advantages of the invention will become apparent as the specification proceeds.

DETAILED DESCRIPTION

The microparticles may be formed of any glass or glassy substance which is inert; that is, one which will not leach toxic substances when exposed to body fluids. Glass having a high silica content, such as conventional soda-lime glass, has been found particularly effective. The soda-lime content is believed to be particularly important because some sodium ions are released when such glass is exposed to aqueous fluids. As a result, such exposure tends to raise the pH of the blood, creating a bacteriostatic or bactericidal environment which further enhances the healing process.

The precise reasons for the high degree of effectiveness of glass microparticles in forming a surgical dressing in situ are not fully known, partly because the complex chemical and biological processes of blood and its components are not fully known. It is believed important that the microparticles have a density (specific gravity) and size which facilitates their application to the site of injury and which promotes their retention at that site. In particular, the particles must be heavy enough so that they remain at the site and are not carried away by the flow of blood. Coagulation is promoted as the blood contacts the surfaces of the particles and fibrin formation produces a scab in which the microparticles function as the matrix. Since the particles have a specific gravity greater than blood, it might be thought that such particles would migrate from the site through the vascular system to other parts of the body; however, tests reveal that no such migration occurs.

It is to be emphasized that the glass particles act to form the only dressing required; an overlying bandage or covering is unnecessary and may even be undesirable. Since glass is a relatively poor thermal conductor, the glass particle surgical dressing serves as a protective thermal insulator. Such thermal insulation is particularly important in the treatment of burns, abrasions, and other injuries in which a substantial surface area may be involved.

While particles within the size range of 30 to 150 mesh are believed acceptable, the important benefits of the invention may be more fully achieved with particles in the range of 70 to 100 mesh. Larger-sized particles are unsatisfactory because they tend to roll and are therefore difficult to apply and retain, and because they provide less surface area for their volume. On the other hand, particles that are too small are also difficult to use because they cannot be easily directed onto the wound area and because they tend to float and be flushed away by fluid at the wound site.

The healing of injuries directly treated with the glass microspheres is surprisingly rapid and the incidence of infection is extremely low, perhaps because of the alkaline composition of the glass and the bacteriostatic effect which an increase in pH levels produces. The effectiveness of the invention is further illustrated by the following examples:

EXAMPLE 1

Skin was harvested from two adult male white Yorkshire swine with an air-powered dermatome, producing normal capillary hemorrhage. Immediately thereafter, the donor sites were dusted with microspheres of a high grade crown optical glass of the soda-lime type having no less than 62 percent silica content, such microspheres falling within the size range of 70 to 100 mesh. Sufficient quantities of such particles were dusted upon the donor sites to retain the blood and arrest bleeding. The animals were each given 1,000,000 units of penicillin and isolated together in a recovery area.

Two additional swine from the same group and of similar size were subjected to a like treatment but were given no antibiotics. A final pair of swine of the same group and same general size were similarly treated except that no microparticles were dusted on the donor sites, such animals therefore serving as controls.

The application of the glass microparticles to the raw donor sites in the first four animals brought hemorrhaging to a complete stop with no visual signs of tissue weeping or loss of body fluids. The animals gave no appearance of shivering or loss of heat. No post-recovery problems were encountered and, at the end of 48 hours, the healing processes and regeneration of tissue appeared well underway. Complete healing of the donor sites of the first four animals occurred within 24 to 26 days following surgery. Histologic sections indicated nothing but normal tissue at the ceramic interface. There were no incidents of granuloma. Upon release of the escar, including the ceramic matrix, the fresh skin areas were smooth, even, and healthy in appearance. By contrast, the remaining two animals recovered slowly; no signs of any healing processes were apparent at the seventh post-surgical day and, at the end of the thirtieth post-surgical day, each animal still had several large wound areas remaining unhealed. In those areas where healing had occurred, the skin appeared rough, uneven, and contaminated with pustules.

EXAMPLE 2

An experiment was undertaken where standard donor sites were created by an air-powered dermatome on one side of the backs of two mini swine. The sites were treated with radioactive ceramic microspheres in the manner set forth in Example 1 and the animals were then placed in cages where the wounds were permitted to heal in normal fashion. Scab samples were read in a scintillation counter as they were released. After complete healing had taken place, the same donor locations were sampled and the newly harvested skin was sectioned and examined microscopically with control samples of virgin skin taken from the opposite sides of the animals. All samples were read in the scintillation counter for evidence of radioactivity. Comparison studies showed no evidence of the presence of glass in the newly generated tissue.

EXAMPLE 3

Experimental tests concerning the use of ceramic spheres for hemostasis indicated that the material is an effective hemostatic agent, even in very moderate amounts. In a series of four animals (dogs) it was shown that bleeding, from severe wounds to the liver, spleen and kidney could be quickly controlled. The procedure involved laparotomy followed by injury to the liver, spleen and kidney by a blunt instrument until hemorrhage was liberal. Thereafter, a quantity of glass microspheres as described in Example 1 equal to 1.0 to 1.5 percent of the weight of the animal was placed in the wound site and held with gentle pressure for approximately five minutes. The incision was then closed.

Each animal fully recovered. At intervals commencing approximately one year following the operations, each animal was sacrificed and the organ exposed to the glass microparticles was examined. The autopsies indicated that the spheres remained at the sites of the injuries, held in place by omentum which covered the surfaces of the wounds. The particle-tissue interfaces showed little or no foreign body reaction.

EXAMPLE 4

To further evaluate possible migration of the ceramic microspheres when used internally, a series of 11 dogs were treated with microspheres similar to those described in Example 1 except that such microspheres were radioactive. The microparticles were introduced into the peritoneal cavity of each animal in an amount equal to approximately 0.5 percent of the animal's body weight. The animals were thereafter sacrificed at 15-day intervals. Autopsies were performed and samples of all pertinent tissue were read on a scintillation counter to determine whether the microspheres had migrated into the lymph nodes, lungs, and other organs. There was no evidence that the ceramic microspheres had moved out of the peritoneal cavities.

EXAMPLE 5

Blood can be stored at 4° C. for up to three weeks when mixed with a suitable anticoagulant such as ACD (acid-citrate-dextrose) or CPD (citrate-phosphate-dextrose). The addition of adenine to these anticoagulants prolongs the storage time to 5 weeks.

The pH of blood decreases during storage due to the production of lactic acid by the metabolism of dextrose in the red cells. Along with the fall in pH there is an associated fall in 2,3-diphosphoglycerate (DPG) inside the red cells which causes an increase in the oxygen affinity of hemoglobin. This means that the red cells do not release oxygen to the tissues as readily as they do in fresh blood; this can result in poor oxygen transport which is a danger to the severely ill patient who receives many units of old blood.

The following test was conducted and its results reveal that glass powder can raise the pH of stored blood, resulting in better DPG maintenance.

Fifty ml of human blood mixed with CPD-adenine anticoagulant (CPD formula per USP XVIII p. 48, containing 0.5 mg/ml of adenine, pH adjusted to 7 with sodium hydroxide) were placed in two 100 ml plastic blood bags. One bag contained 20 grams of microspheres of optical grade soda-lime glass (70–100 microns) while the other served as a control. The bags were stored at 4 degrees C. Samples were withdrawn weekly for measurement of pH and DPG. A Beckman pH meter was used for the determination of pH, and DPG was assayed by the enzymotic method of Loos and Prins, "Applications of a Mechanized Method for the Determination of Different Glycolytic Intermediates in the Routine Quality Control of Red Cells," in Red Cell Metabolism and Function, Brewer Ed., Plenum Press, pp. 277–288 (1970.

The results of this experiment are set forth below:

Table 1 pH and DPG Levels in Stored Blood With and Without Glass Microspheres

| Time at 4°C. (weeks) | Control pH | Control DPG | Glass pH | Glass DPG |
| --- | --- | --- | --- | --- |
| 0 | 7.75 | 13.15 | 7.81 | 13.13 |
| 1 | 7.57 | 13.15 | 7.71 | 11.40 |
| 2 | 7.49 | 13.55 | 7.62 | 16.70 |
| 3 | 7.34 | 8.55 | 7.50 | 12.55 |
| 4 | 7.19 | 4.43 | 7.39 | 10.17 |

In the above table, DPG levels are expressed in micromoles per gram of hemoglobin.

While in the foregoing an embodiment of the invention has been disclosed in considerable detail for purposes of illustration, it will be understood by those skilled in the art that many of those details may be varied without departing from the spirit and scope of the invention.

I claim:

1. A method of arresting bleeding and forming a thermally insulating dressing in situ, comprising the steps of applying a quantity of ceramic microparticles directly to the site of injury, such microparticles having a specific gravity greater than 1.0 and a size within the range of 30 to 150 mesh, and continuing such application until the quantity of microparticles exceeds the volume of blood and other fluid at said site.

2. The method of claim 1 in which said microparticles are of a glass composition containing sodium and capable of releasing sodium ions when exposed to said fluid.

3. The method of claim 1 in which said microparticles are of a size within the range of about 70 to 100 mesh.

4. The method of claim 1 in which said microparticles are generally spherical in shape.

* * * * *